United States Patent [19]
Micklisch et al.

[11] Patent Number: 6,109,885
[45] Date of Patent: Aug. 29, 2000

[54] VACUUM SYSTEM FOR A TRANSFER SYSTEM

[75] Inventors: Michael Micklisch; Guenter Cieslok, both of Goeppingen, Germany

[73] Assignee: Schuler Pressen GmbH & Co., Goeppingen, Germany

[21] Appl. No.: 09/122,783

[22] Filed: Jul. 27, 1998

[30] Foreign Application Priority Data

Jul. 25, 1997 [DE] Germany ............................ 197 32 056

[51] Int. Cl.⁷ .................................................. F04B 49/00
[52] U.S. Cl. .......................... 417/297; 417/306; 137/502
[58] Field of Search ..................................... 417/297, 299, 417/300, 301, 302, 303, 304, 306, 307, 308, 309, 310, 311, 182, 185–193; 137/482.5, 502, 557, 560; 414/627, 737, 752, 793, 797

[56] References Cited

U.S. PATENT DOCUMENTS 5,059,088  10/1991  Klein .
5,088,382  2/1992  Goedecke et al. .................. 91/275
5,184,647  2/1993  Goedecke et al. .................. 91/275
5,188,411  2/1993  Golden .
5,244,242  9/1993  Goedecke et al. .
5,320,497  6/1994  Nagai et al. .

FOREIGN PATENT DOCUMENTS

0 603 396 A1  6/1994  European Pat. Off. .

*Primary Examiner*—Mark Paschall
*Assistant Examiner*—Thor Campbell
*Attorney, Agent, or Firm*—Evenson, McKeown, Edwards & Lenahan, P.L.L.C.

[57] ABSTRACT

A vacuum system, particularly for vacuum grippers, has a fluid entrainment pump for generating the vacuum which, when the required vacuum is built up, is supplied with a throttled compressed-air flow. For the throttling of the compressed-air flow, a controlled throttle device is used which, as a function of the detected vacuum value, throttles the compressed-air flow to the fluid entrainment pump when the desired vacuum value has been reached or exceeded.

10 Claims, 5 Drawing Sheets

| FUNCTION | COIL 34 | COIL 33 | | |
|---|---|---|---|---|
| | 0 | 0 | 0 | 0 |
| | 0 | 1 | 0 | 0 |
| | 0 | 0 | 0 | 0 |
| | 1 | 0 | 0 | 0 |
| | 0 | 1 | 0 | 0 |
| | 0 | 0 | 0 | 1 |

VACUUM SYSTEM FOR A TRANSFER SYSTEM

BACKGROUND OF THE INVENTION

This application claims the priority of German application 197 32 056.2, filed Jul. 25, 1997, the disclosure of which is expressly incorporated by reference herein.

The present invention relates to a vacuum system, particularly for a transfer system having vacuum grippers.

Transfer systems, particularly transfer systems for large-part presses in which relatively large sheet metal parts are to be placed in press stations and are to be moved therefrom, frequently have vacuum grippers which temporarily hold the sheet metal parts. The vacuum grippers must be supplied with a vacuum which in practice is usually provided by venturi nozzles acting as fluid entrainment pumps. These are operated by compressed air taken from a compressed-air supply system. As soon as the fluid entrainment pump is acted upon by compressed air serving as a pump fluid, it generates a vacuum at its suction connection which is guided to the vacuum grippers. In order to switch the vacuum on and off, the compressed air guided to the fluid entrainment pumps is switched on and off by way of a corresponding valve device. The valve device is controlled by an electric control unit which is connected by a corresponding number of control lines with the valve device.

While, during the buildup of the vacuum, the fluid entrainment pump must remove relative large amounts of air from the vacuum grippers and the connected pipes, the suctioned and held sheet metal parts will then block the admission of air so that the vacuum must only be maintained but hardly any more air must be conveyed. The compressed-air quantity used for the operation of the fluid entrainment pumps must be generated by the compressed-air system of the transfer system or the press system. A corresponding dimensioning is required here, in which case naturally a low compressed-air consumption is desirable.

SUMMARY OF THE INVENTION

An object of the present invention is to provide a vacuum system which has a compressed-air consumption which is as low as possible.

This object has been achieved by a vacuum system having a pump device which, when acted upon by compressed air, on a suction connection, generates a suction effect as a function of the admission of compressed air, having at least one vacuum-operated holding device which is connected with the suction connection of the pump device, and having a supply device which is connected to the pump device and can be acted upon by compressed air by way of the pump device, the supply device containing a controllable throttle device, which is connected in front of the pump device, for switching the suction effect of the pump device at least between two different suction levels.

In the vacuum system according to the present invention or the corresponding transfer system, the vacuum is generated by a fluid entrainment pump (venturi nozzle). The fluid entrainment pump is supplied with compressed air by a supply device which is finally controlled by an electric control unit. The supply device contains a valve device which alternately releases or blocks the compressed air to the fluid entrainment pump. The valve device is controlled by the control device which, for this purpose, is connected with the valve device by corresponding control lines. The valve device includes, for example, one or several electromagnetically controlled pilot valves which pneumatically operate a directional control valve.

The supply device also includes a throttle device which is connected in front of the fluid entrainment pump and whose throttling effect can be pneumatically switched between two defined levels. In one position, the throttle device has no or at most a low throttling effect while, in its other position, it exercises a considerable throttling effect. In this position, the compressed-air inflow to the fluid entrainment pump and thus to the compressed-air consumption is reduced. The throttle device will always be switched to a more intense throttling of the compressed-air flow when the vacuum-operated gripper devices have received the workpiece to be held and the required vacuum has been built up. In this condition, the weaker compressed-air flow admitted by the throttle device will be sufficient for operating the fluid entrainment pump with a lower delivery output which is sufficient for maintaining the vacuum when the workpieces close the suction opening of. the vacuum gripper devices and therefore block the afterflowing of air into the vacuum system.

The throttle device can be pneumatically switched. Thereby, no additional electric control lines must be led to the superset electric control unit. Constructive or structural changes of the control device of cable trees or the like are not required.

In addition to generating a vacuum for the vacuum-operated gripper devices, it may be necessary to temporarily admit compressed air thereto. In this manner, the vacuum, which holds the workpieces on the gripper devices, can be rapidly reduced for depositing the workpieces. Furthermore, the workpieces can be released by a temporary excess pressure on the gripper devices. For this purpose, the supply device contains a valve device by which the gripper device can be acted upon by compressed air, the valve device preferably having three switching positions. While the first and the second switching position of the valve device are used for blocking and releasing the compressed air to the fluid entrainment pump, in the third switching position, the gripper devices are acted upon by compressed air.

For the foregoing purpose, the valve device is preferably constructed as a five/three-way valve which is operated by the electric control unit. This can be carried out directly, for example, by magnet coils, or pneumatically. Pressure signals are fed to pilot inputs by way of electromagnetically operated pilot valves. For fixing the three switching positions of the valve device (directional control valve), two electric control lines are sufficient, the directional control valve taking up, for is example, its blocking position when both control lines carry no signal. Its position in which the fluid entrainment pump is maximally supplied with compressed air is taken up, for example, when one of the control lines carries a signal, while the position for admitting pressure to the gripper devices (releasing the workpieces) is taken up when the other control line carries a signal.

The additional introduction of the air saving condition becomes possible by a detent device which, once the directional control valve has been changed into the suction position, holds it in this position even when the corresponding triggering signal ceases. The ceasing of this triggering signal can be used directly or indirectly for switching off the throttle device.

In order to change the directional control valve from the locking condition into the condition which is next in the process sequence, it receives a release pulse by way of the control lines or the corresponding admission pressure connection which release pulse switches the directional control valve.

The throttle device can also be controlled by the generated vacuum. Thereby, it will always switch over to an increased throttling when a sufficient vacuum has built up. This has the advantage that the throttling of the compressed-air supply virtually takes place in a regulated manner. If, for example, because of a leakage of the vacuum system or because of a poorly fitting gripper device, ambient air penetrates into the vacuum system, the throttle device will no longer switch over if a corresponding threshold value is defined, whereby, although the compressed air is not throttled and thus more compressed air is consumed, the gripping effect of the gripper devices is maintained.

In a particularly advantageous embodiment of the invention, the throttle device is arranged in an intermediate plate between the valve housing of the valve devices constructed as a directional control valve and its connection plate. For controlling the throttle device, a duct extends from a pilot connection of the directional control valve to the throttle device. This duct can be constructed as an external channel as well as in the form of a bore penetrating the valve housing. In either case, the air saving circuit can be integrated simply by inserting the intermediate plate into the valve arrangement, without the requirement of other constructional changes on the vacuum system. Therefore, neither additional electrical lines are required, nor additional pneumatic lines extending over larger distances are required but only two intermediate pieces or plates and one short line on the directional control valve.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Figure 1:
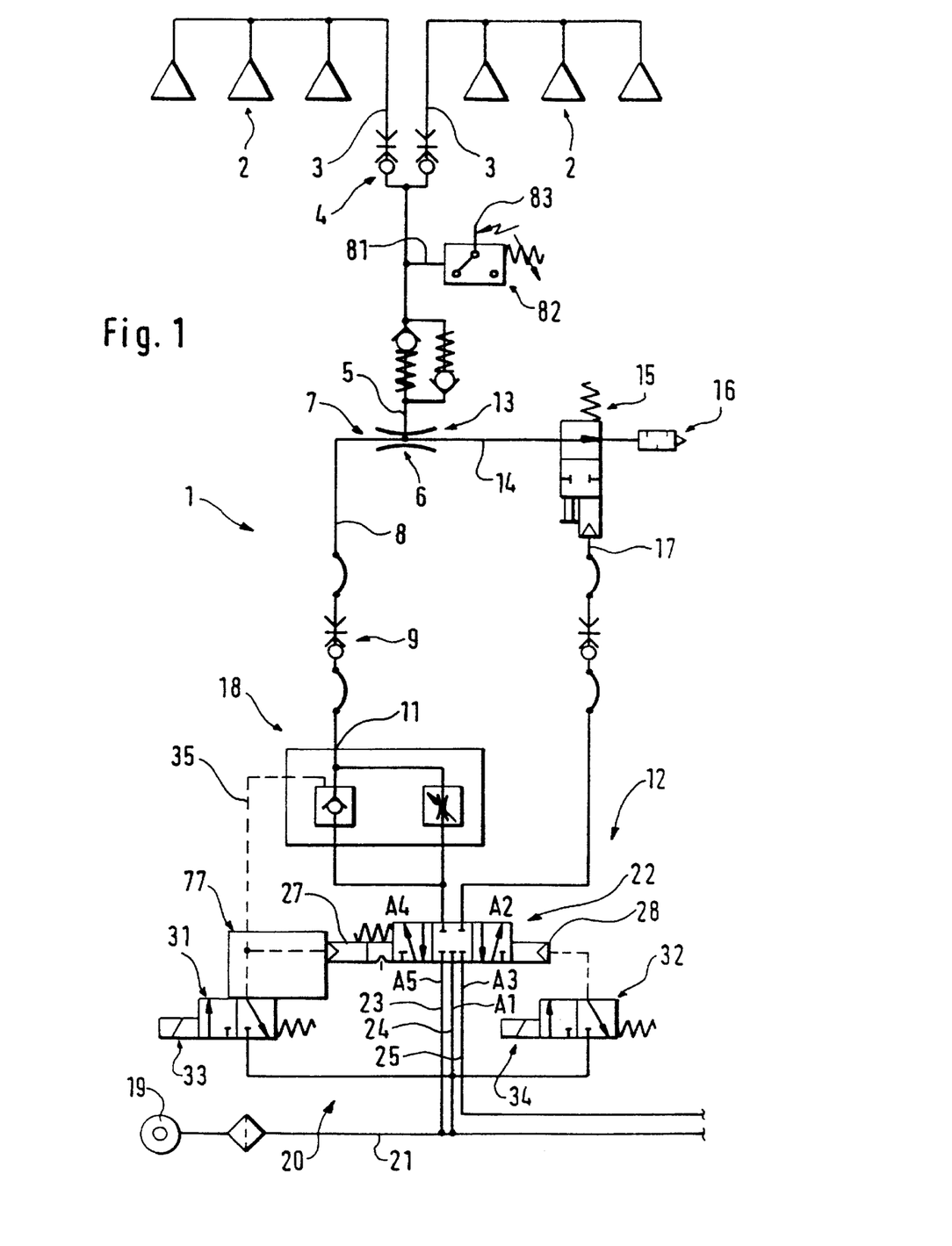
FIG. 1 is a basic schematic pneumatic layout plan of a vacuum system according to the present invention.

FIG. 1 illustrates a vacuum system 1 which is part of a transfer system and which has the purpose of supplying vacuum suction devices 2 with a vacuum in a controlled manner. The vacuum suction devices 2 are constructed as suction cups or comparable suction elements and are fastened to a transfer system, for example, to suction traverses. They are used for holding flat-shaped workpieces, such as blanks (metal sheets) when they are acted upon by the vacuum, and for releasing them when the vacuum is reduced.

The vacuum suction devices 2 are connected by pipes 3 and optionally coupling devices 4 with a suction connection 5 of a fluid entraining pump 6 which is operated by compressed air. For this purpose, the fluid entrainment pump 6 has a working fluid connection 7 which, via a pipe 8, in which coupling devices 9 may be arranged, is connected with a connection 11 of a valve arrangement 12. In addition, the fluid entrainment pump 6 has an output connection 13 which extends by way of a pipe 14 and a 2/2-directional control valve 15 to an outlet 16. The 2/2-way valve is pneumatically controlled by way of a pipe 17 which is connected to a connection $A_2$ of the valve arrangement 12. The valve arrangement 12 has the purpose of selectively admitting compressed air to the pipe 17 and/or the pipe 8, such that the pipe 8 can be acted upon by different source strengths. A variable throttle device 18 is used for this purpose which is connected in front of the connection 11. The valve arrangement 12 connects the vacuum system 1 with a compressed-air source 19 and a corresponding distributing pipe 21.

The valve arrangement 20 contains a 5/3-way valve 22 as a central element which is pneumatically controlled. Output connection $A_4$ connects the 5/3-way valve 22 with the throttle device 18. Two pipes 23, 24 starting out from its connections $A_5$ and $A_1$ lead to the distributor pipe 21. A pressureless vent pipe 25 leads to another connection $A_3$ of the 5/3-way valve 22.

The five/three way valve 22 is controlled by two pneumatic cylinders 27, 28 which are operated by pilot pressure via pilot valves 31, 32 which are electrically triggered by corresponding magnet coils 33, 34. A control line 35 allows the pilot valve 31 to pneumatically control the throttle device 18 in that the throttle device 18 switches to an unhindered passage when the control line 35 carries pressure.

Figure 2:
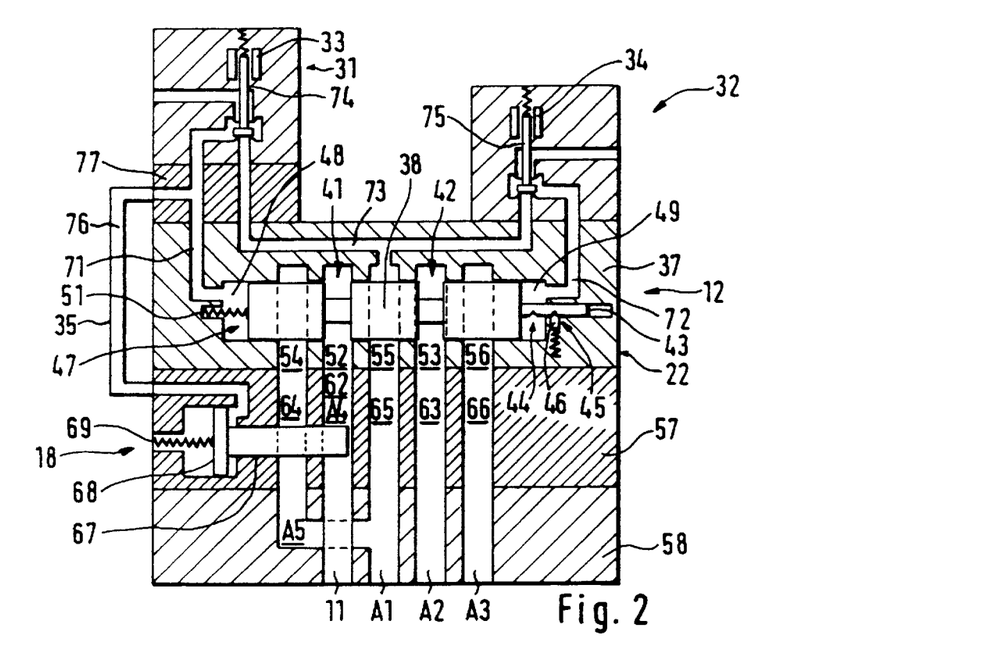
FIG. 2 is a simplified schematic sectional view of the directional control valve belonging to the vacuum system according to FIG. 1 with a pneumatically controlled throttle device, in the basic position.
Figure 3:
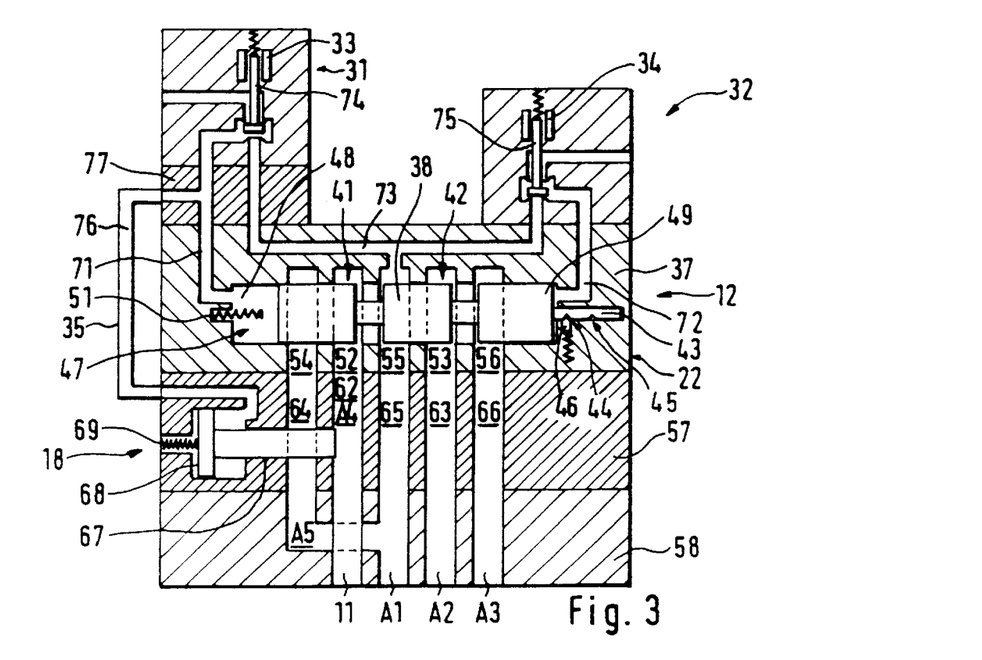
FIG. 3 is a simplified schematic sectional view of the directional control valve belonging to the vacuum system according to FIG. 1 with a pneumatically controlled throttle device, in the suction position.
Figure 4:
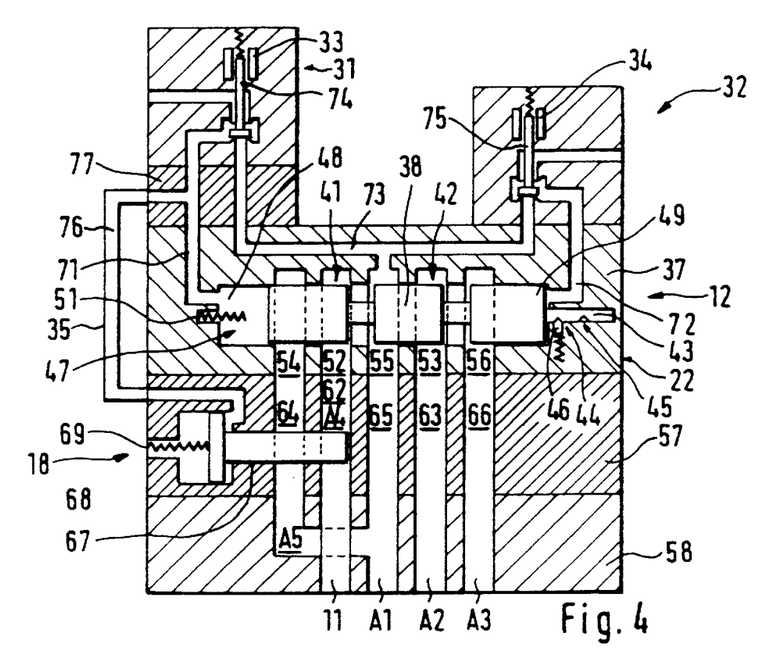
FIG. 4 is a simplified schematic sectional view of the directional control valve belonging to the vacuum system according to FIG. 1 with a pneumatically controlled throttle device, in the reduced suction position.
Figure 5:
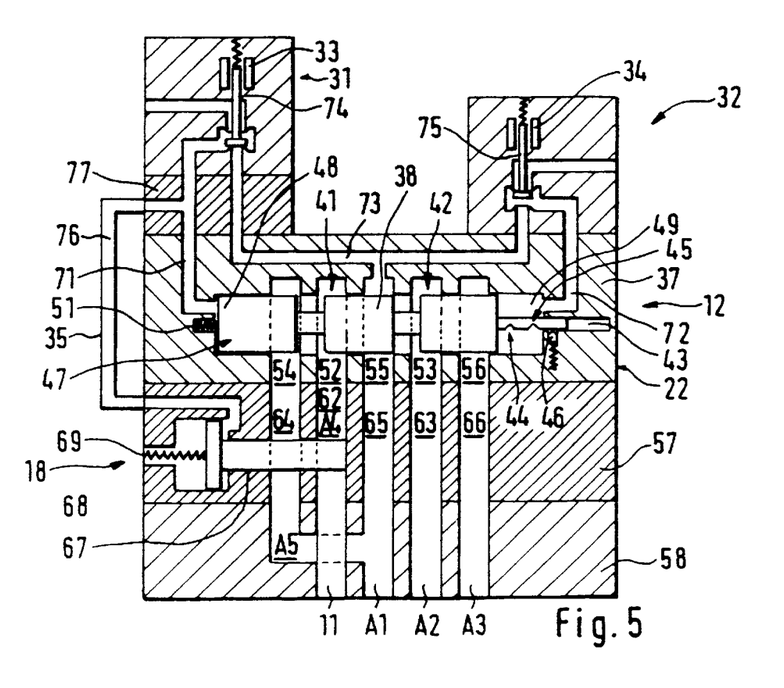
FIG. 5 is a simplified schematic sectional view of the directional control valve belonging to the vacuum system according to FIG. 1 with a pneumatically controlled throttle device, in the release position.

The construction of the valve arrangement 12, of the throttle device 18 and of the pilot valves 31, 32 is shown in the schematic representation of FIG. 2 as well as FIGS. 3, 4 and 5. The 5/3-way valve 22 has a valve body 37 in which a rotationally symmetrically constructed slide valve 38 is disposed in an axially displaceable manner. Starting out from a basic cylindrical shape, the slide valve 38 has two circumferential grooves 41, 42 which are arranged at a distance parallel to one another and each have an approximately rectangular cross-section. On the face side, the slide valve 38 is provided with a lengthened portion 43 which has two mutually spaced detent recesses 44, 45. An elastically disposed detent nose 46, which is disposed in the basic body 37 to be radially movable with respect to the lengthened portion 43, is assigned to the detent recesses 44, 45.

In addition, the slide valve 38 is disposed in a cylindrical chamber 47 which is closed at both ends. Thus, the axial faces of the slide valve 38 with the chamber 47 define two cylinder volumes 48, 49 which are used as pneumatic cylinders 27, 28 (FIG. 1) for driving the slide valve 38. A spring 51 prestresses the slide valve 38 to its center position.

Ring-shaped sections 52, 53 are constructed on the chamber 47 which expand radially to the outside. The sections 52, 53 are assigned to the ring grooves 41, 42 of the slide valve 38 in the center position and communicate with the output connections $A_4$, $A_2$. Two additional sections 54, 55 of the chamber 47 which expand to the outside in a ring shape and which communicate with the input connections $A_1$, $A_5$ are arranged adjacent to the section 52. Section 55 is situated between sections 52, 53. A further ring-shaped section 56, which expands radially to the outside is adjacent to section 53 on its other side 1 and communicates with the connection $A_3$.

For connecting the chamber sections 52 to 56 with the connections $A_1$ to $A_5$, an intermediate plate 57 and a connection plate 58 are used and have corresponding ducts 62 to 66. On its plane side facing the basic body 37, the intermediate plate 57 has an opening pattern or hole pattern which corresponds to the hole pattern on the plane side facing the connection plane 58. It can subsequently be installed in a valve arrangement 12 which is otherwise constructed without an intermediate plate 57 with a direct connection between the basic body 37 and the connection plate 58. The intermediate plate 57 can therefore be retrofitted.

The duct 62 which penetrates the intermediate plate 57 can be throttled arbitrarily. A tappet 67, which projects into the duct 62 and whose end facing away from the duct 62 is connected with a pneumatic piston 68, is used for this purpose. The tappet 67 is prestressed by a pressure spring 69 to its pushed forward position, in which is projects maximally into the duct 62 and leaves only a narrow passage.

The two pilot valves 31, 32, which are connected by control ducts 71, 72 with the working volumes 48, 49, are used for operating the 5/3-way valve by an axial displacement of the slide valve 38. The pilot valves 31, 32 receive compressed air via a duct 73 which is connected with the connection $A_1$ by way of the section 55 and the duct 65. The pilot vales 31, 32 are seat valves whose valve closing member 74, 75 is elastically prestressed to a position in which the duct 73 is closed in each case and the ducts 71, 72 are vented toward the outside. When the pilot valves 31, 32 are triggered, a connection which is tight to the outside is established between the duct 73 and the ducts 71 or 72.

The control line 35 forms an additional duct 76 which is used for operating the throttle device 18. The control line 35 extends from the duct 71 to the pneumatic piston 68 such that an admission of pressure to the pneumatic piston 68 leads the tappet 67 out of the duct 62 against the force of the pressure spring 69. An intermediate piece 77, which is inserted between the pilot valve 31 and the basic body 37 and has a hole pattern on the flat side facing the pilot valve 31 which hole pattern corresponds to the hole pattern on the opposite side, is used for tapping the duct 71. From the intermediate piece 77, a piping with the duct 76 leads to the intermediate plate 57. As an alternative, a connection bore can also be provided between the duct 71 or the working volume 48 and the corresponding working volume of the pneumatic piston 68. The intermediate plate 77 can be retrofitted without any constructive change of the 5/3-way valve 22.

A branch-off 81 connects line 3 (see FIG. 1) with a pressure sensor 82 which emits an electric signal on a line 83 when a defined vacuum has been reached or there is a falling below a defined vacuum. If the pressure is higher than the defined vacuum, no signal or a different signal is emitted at line 83.

Figure 6:
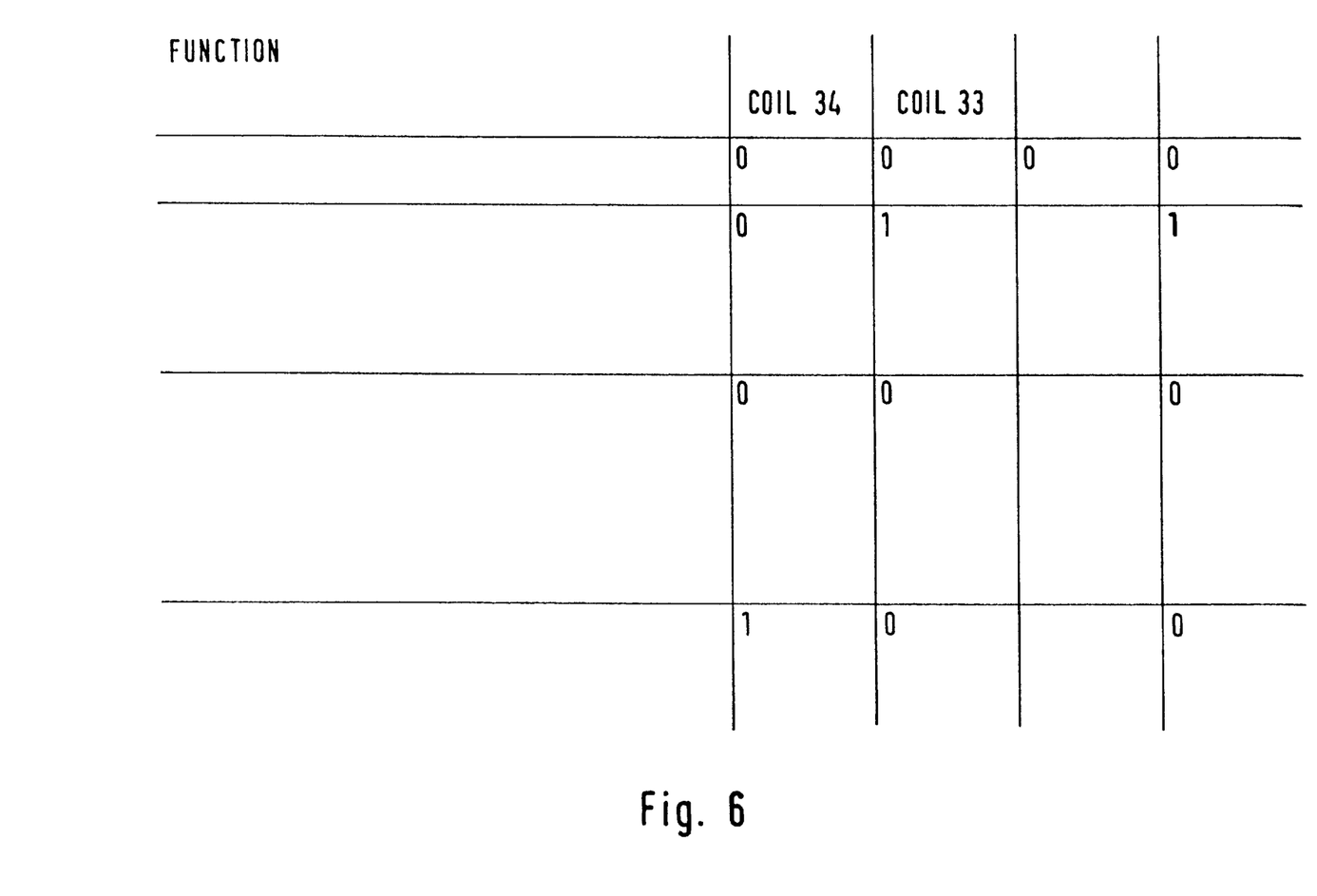
FIG. 6 is a triggering table for the directional control valve according to FIGS. 1 to 5.

In the basic position of the valve arrangement 12 illustrated in FIG. 2, the slide valve 38 is in the center position. Neither the output $A_4$ nor the output $A_2$ receive compressed a ir from the source 19. This condition is illustrated in FIG. 6 in the first line as "valve blocked." Neither line 8 nor line 17 (FIG. 1) carry compressed air so that the vacuum suction devices 2 neither hold parts nor release them. Thus, they are inactive.

In order to be able to suction and hold a workpiece by way of the vacuum suction devices 2, the magnet coil 33 of the pilot valve 31 is triggered so that the valve closing member 74 changes from its position illustrated in FIG. 2 to its position illustrated in FIG. 3. In FIG. 6, this condition of the valve arrangement 12 corresponds to the second line. The working volume 48 is acted upon by pressure by way of the ducts 65, 73, 71 so that the slide valve 38 is changed into a position which is on the right in FIG. 3. In this position, the connections, $A_1$, $A_4$ and the connection $A_3$, $A_2$ are connected with one another. As a result, line 8 (FIG. 1) can be acted upon by compressed air and the line 17 is free of pressure. By way of duct 76 (FIG. 3), the pneumatic piston 68 is acted upon by pressure so that the tappet 67 releases the full passage of the duct 62. The compressed air which arrives at the fluid entrainment pump 6 via the line 8 flows through the fluid entrainment pump 6 and, via the line 14 and the 2/2-way valve 15, arrives into open air. Because line 17 is free of pressure, the 2/2-way valve is switched to passage. Thus, the fluid entrainment pump 6 generates a vacuum at its suction connection 5 and delivers air with a high delivery output by way of lines 3 out of the vacuum suction devices 2. This generates the vacuum required for holding parts on vacuum suction devices 2.

When a workpiece is suctioned by the vacuum suction devices 2, no outside air or almost no outside air can flow into the lines 3 and thus into the vacuum system 1 as an afterflow. As a result, a vacuum is built up which will soon fall below the threshold value adjusted at the pressure sensor 82. The pressure sensor 82 thus emits an electric signal at the line 83 which signalizes to a superset control for triggering the magnetic coils 33, 34 that the desired vacuum value has been reached. The control now switches off the magnetic coil 33 whereby the pilot valve 31 closes again (FIG. 4). As a result, the working volume 48 and, by way of the duct 76, the working volume defined by the pneumatic piston 68 become pressureless. While the slide valve 38 remains locked by the detent element 46 in its position displaced the farthest to the right, the tappet 67, driven by the pressure spring 69, returns into its inoperative position in which it closes the duct 62 with the exception of a slight passage, thereby throttling the duct 62. Thus, compressed air reaches the fluid entrainment pump 6 by way of the line 8 but only in a throttled manner, and the fluid entrainment pump 6 therefore operates with a reduced output. The compressed-air consumption is noticeably reduced, whereby the lower suction output of the fluid entrainment pump 6 is sufficient for maintaining the vacuum in the lines 3 and thus at the vacuum suction devices 2.

Should the vacuum in the system become weaker than intended because of a leakage or because of an insecure seat of a vacuum suction device 2, the pressure sensor 82 senses this condition and then switches over. Thereupon, the superset control, as the result of the triggering of the pilot valve 31, will switch back to suction with a full delivery output as illustrated in FIG. 3.

If a part held by the vacuum suction devices 2 is to be deposited (released), according to the table (FIG. 6), while the magnetic coil 33 is currentless, the magnetic coil 34 is triggered. Thus, as illustrated in FIG. 5, the duct 73 is connected with the duct 72. As a result, the working volume 49 is acted upon by pressure, while the working volume 48 is relieved from pressure. Thereby, the ducts 65, 63 and thus the connections $A_1$, $A_2$ are connected with one another. By way of duct 64, the connection $A_4$ receives from duct 65 also a connection to the connection $A_1$ which, however, is throttled by the tappet 67.

The thus occurring admission of pressure to line 17, which so far had been pressureless, leads to the switching of the 2/2-way valve 15 which therefore blocks the line 14. The fluid entrainment pump 6 can now no longer operate as a fluid entrainment pump, and the compressed air flowing via connection A$_4$ and the throttle to the connection 11 reaches the vacuum suction devices 2 by way of the fluid entrainment pump 6 which now only operates as a connection. This results, therefore, in a very rapid reduction of the existing vacuum and possibly also to the buildup of a slight excess pressure, whereby held parts are immediately released. If both magnet coils 33, 34 become currentless, the valve arrangement 12 will return into its initial position illustrated in FIG. 2.

Figure 7:
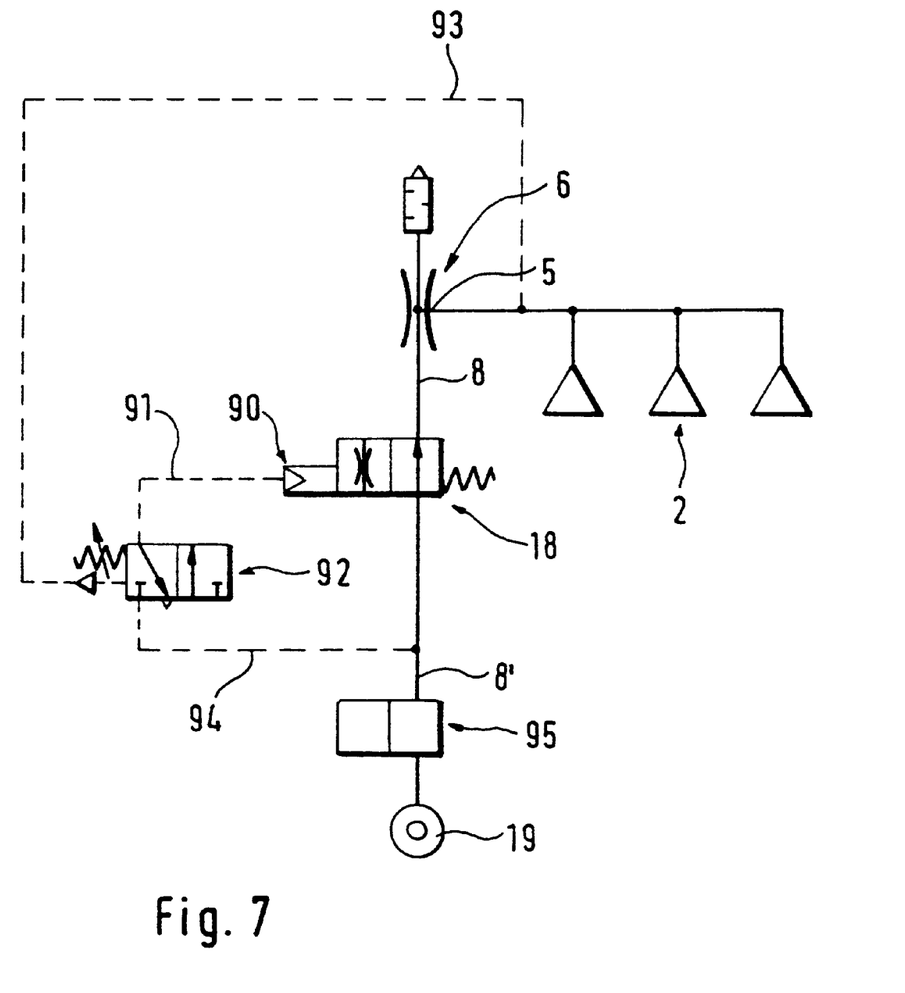
FIG. 7 is a basic diagram of an alternative embodiment of a vacuum system according to the present invention with an air saving circuit.

FIG. 7 shows a simplified embodiment of the present invention. The vacuum suction devices 2 are supplied with a vacuum also by way of a fluid entrainment pump 6. The fluid entrainment pump 6 receives the compressed air required for the operation via the line 8 from the compressed-air source 19. A switchable throttle device 18 is arranged in the line 8. This throttle device 18 is prestressed by a spring prestressing toward a position in which it lets the compressed air flow through almost unhindered. The switchable throttle device can be switched by a pneumatic cylinder 90 into a position in which it throttles the compressed-air passage. A control line 91 connects the pneumatic cylinder 90 to a vacuum-operated 3/2-way valve 92. A suction pipe 93 is used for this purpose which is connected with the vacuum suction devices 2.

The 2/2-way valve is a spring-prestressed valve which is constructed to vent a pipe 94 connected with the compressed-air source 19 when the vacuum applied by way of the suction pipe 93 has not yet reached its desired value. When the desired value has been reached or the applied pressure is still lower than required, however, the 3/2-way valve operating as a pressure sensor will switch over so that the line 94 is connected with the control line 91. As the result, the throttle device 18 is switched from full passage to throttled passage. The throttled compressed-air flow by way of the line 8 to the fluid entrainment pump 6 is sufficient for maintaining a once built-up vacuum at the vacuum suction device 2. The compressed-air consumption is, however, reduced significantly. Furthermore, no additional control devices are required. The operation of the vacuum suction devices 2 takes place by a simple valve 95 which is switched between the compressed pressure source 19 and the supply lines 8, 8'. Additional regulating or control expenditures, particularly interventions into existing controls, are unnecessary.

If the vacuum breaks down because of a leakage or a defect, the 3/2-way valve 92 and the throttle device 18 switch back, whereby the fluid entrainment pump 6 again receives its full suction output.

A vacuum system, particularly for vacuum grippers, has a fluid entrainment pump 6 for generating a vacuum which, when the required vacuum has been built up, is supplied with a throttled compressed-air flow. For throttling the compressed-air flow, a controlled throttle device 18 is used which throttles the compressed-air flow to the fluid entrainment pump 6 as a function of the detected vacuum value, when the desired vacuum value has been reached or exceeded.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Vacuum system for vacuum grippers of a transfer system, comprising
   a pump device configured to generate, when acted upon by compressed air, on a suction connection, a suction effect as a function of admission of compressed air,
   at least one vacuum-operated holding device which is operatively connected with the suction connection of the pump device, and
   a supply device which is operatively connected to the pump device and is arranged to be acted upon by compressed air via the pump device, wherein
   the supply device contains a controllable throttle device, which is connected upstream of the pump device, for switching the suction effect of the pump device at least between two different suction levels., wherein the throttle device is controllable by the generated vacuum such that the throttle device has a higher throttling effect in a condition of falling-below a defined pressure value on the holding device, and the throttle device has a lower throttling effect in a condition of a defined pressure value exceeded on the holding device.

2. Vacuum system for vacuum grippers of a transfer system, comprising
   a pump device configured to generate, when acted upon by compressed air, on a suction connection, a suction effect as a function of admission of compressed air,
   at least one vacuum-operated holding device which is operatively connected with the suction connection of the pump device, and
   a supply device which is operatively connected to the pump device and is arranged to be acted upon by compressed air via the pump device, wherein
   the supply device contains a controllable throttle device, which is connected upstream of the pump device, for switching the suction effect of the pump device at least between two different suction levels, wherein the supply device comprises a valve device for releasing and controllably blocking compressed air to be guided to the pump device and, the valve device comprises at least a first switching position in which the compressed air is released to the pump device, a second switching position in which the compressed air is blocked to the pump device, and a third switching position in which the pump device is switched inactive.

3. Vacuum system, for vacuum grippers of a transfer system, comprising
   a pump device configured to generate, when acted upon by compressed air, on a suction connection, a suction effect as a function of admission of compressed air,
   at least one vacuum-operated holding device which is operatively connected with the suction connection of the pump device, and
   a supply device which is operatively connected to the pump device and is arranged to be acted upon by compressed air via the pump device, wherein
   the supply device contains a controllable throttle device, which is connected upstream of the pump device, for switching the suction effect of the pump device at least between two different suction levels, wherein the supply device comprises a valve device for causing compressed air to controllably act on the vacuum-operated holding device and the valve device comprises at least a first switching position in which the compressed air is released to the pump device, a second switching position in which the compressed air is blocked to the pump device, and a third switching position in which the pump device is switched inactive.

4. Vacuum system for vacuum grippers of a transfer system, comprising a pump device configured to generate, when acted upon by compressed air, on a suction connection, a suction effect as a function of admission of compressed air, at least one vacuum-operated holding device which is operatively connected with the suction connection of the pump device, and a supply device which is operatively connected to the pump device and is arranged to be acted upon by compressed air via the pump device, wherein the supply device contains a controllable throttle device, which is connected upstream of the pump device, for switching the suction effect of the pump device at least between two different suction levels, wherein the supply device comprises a valve device for releasing and controllably blocking compressed air to be guided to the pump device and, the valve device is a 5/3-way valve with a control member, which can be changed into three different switching positions and which is elastically prestressed toward a blocking position thereof in which the compressed air supply to the pump device is blocked, and the 5/3-way valve has two pilot inputs, such that with alternative action of pressure upon the pilot inputs, the control member is changeable from a blocking position thereof in one of the two other switching positions, which are a suction position with the admission of pressure to the pump device and a release position in which the pump device is inactive and the holding device is acted upon by pressure.

5. Vacuum system according to claim 4, wherein the supply device comprises a valve device for causing compressed air to controllably act on the vacuum-operated holding device.

6. Vacuum system according to claim 4, wherein the 5/3-way valve includes a detent device which, even if the absence of corresponding pilot pressure, locks the control member in the switching position in which the pump device is supplied with compressed air.

7. Vacuum system according to claim 4, wherein the 5/3-way valve has a valve housing with pilot connections to which pilot valves are associated, optionally via intermediate pieces, the throttle device is operatively arranged in an intermediate plate between the valve housing and a connection plate with a control connection for the throttle device, and the pilot connection is connected with the control connection of the throttle device, whereby the 5/3-way valve is changed into the suction position with the pilot connection being acted upon by pressure.

8. Vacuum system, for vacuum grippers of a transfer system, comprising a pump device configured to generate, when acted upon by compressed air, on a suction connection, a suction effect as a function of admission of compressed air, at least one vacuum-operated holding device which is operatively connected with the suction connection of the pump device, and a supply device which is operatively connected to the pump device and is arranged to be acted upon by compressed air via the pump device, wherein the supply device contains a controllable throttle device, which is connected upstream of the Pump device, for switching the suction effect of the Pump device at least between two different suction levels, wherein the supply device comprises a valve device for releasing and controllably blocking compressed air to be guided to the pump device and, the throttle device is operatively arranged in a pipe between the valve device to the fluid entrainment pump and has a release position in which the compressed air can pass through substantially unimpeded and has a throttling position with a narrowed-down cross-section whereby the compressed-air through-flow encounters a resistance.

9. Vacuum system, for vacuum grippers of a transfer system, comprising a pump device configured to generate, when acted upon by compressed air, on a suction connection, a suction effect as a function of admission of compressed air, at least one vacuum-operated holding device which is operatively connected with the suction connection of the pump device, and a supply device which is operatively connected to the pump device and is arranged to be acted upon by compressed air via the pump device, wherein the supply device contains a controllable throttle device, which is connected upstream of the pump device, for switching the suction effect of the pump device at least between two different suction levels, wherein the supply device comprises a valve device for causing compressed air to controllably act on the vacuum-operated holding device and the throttle device is operatively arranged in a pipe between the valve device to the fluid entrainment pump and has a release position in which the compressed air can pass through substantially unimpeded and has a throttling position with a narrowed-down cross-section whereby the compressed-air through-flow encounters a resistance.

10. Vacuum system, for vacuum grippers of a transfer system, comprising a pump device configured to generate, when acted upon by compressed air, on a suction connection, a suction effect as a function of admission of compressed air, at least one vacuum-operated holding device which is operatively connected with the suction connection of the pump device, and a supply device which is operatively connected to the pump device and is arranged to be acted upon by compressed air via the pump device, wherein the supply device contains a controllable throttle device, which is connected upstream of the pump device, for switching the suction effect of the pump device at least between two different suction levels, wherein the vacuum system comprises a pump device configured to generate, when acted upon by compressed air, on a suction connection, a suction effect as a function of admission of compressed air, at least one vacuum-operated holding device which is operatively connected with the suction connection of the pump device, and a supply device which is operatively connected to the pump device and is arranged to be acted upon by compressed air via the pump device, wherein the supply device contains a controllable throttle device, which is connected upstream of the pump device, for switching the suction effect of the pump device at least between two different suction levels and wherein the throttle device is controllable by the generated vacuum such that the throttle device has a higher throttling effect in a condition of falling-below a defined pressure value on the holding device, and the throttle device has a lower throttling effect in a condition of a defined pressure value exceeded on the holding device.

* * * * *